(12) United States Patent
Maguire

(10) Patent No.: US 8,891,594 B2
(45) Date of Patent: *Nov. 18, 2014

(54) MOBILE COMMUNICATIONS DEVICES AND METHODS HAVING REDUCED COMMUNICATION LATENCY

(71) Applicant: Facebook, Inc., Menlo Park, CA (US)

(72) Inventor: Yael G. Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,546

(22) Filed: Feb. 8, 2013

(65) Prior Publication Data

US 2013/0322498 A1 Dec. 5, 2013

Related U.S. Application Data

(63) Continuation of application No. 13/485,117, filed on May 31, 2012, now Pat. No. 8,437,384.

(60) Provisional application No. 61/491,375, filed on May 31, 2011.

(51) Int. Cl.
*H04B 1/38* (2006.01)
*H01Q 21/28* (2006.01)

(52) U.S. Cl.
CPC . *H04B 1/38* (2013.01); *H01Q 21/28* (2013.01)
USPC ............................................ 375/219

(58) Field of Classification Search
CPC ......... H04B 1/40; H04B 3/23; H04B 17/0042
USPC .................. 375/219–222, 267–269; 342/127; 455/73–88, 299, 67.11; 600/118
See application file for complete search history.

(56) References Cited

U.S. PATENT DOCUMENTS

| | | | |
|---|---|---|---|
| 2005/0206555 A1* | 9/2005 | Bridgelall et al. | 342/127 |
| 2006/0160517 A1* | 7/2006 | Yoon | 455/299 |
| 2009/0163772 A1* | 6/2009 | Koide et al. | 600/118 |
| 2010/0110910 A1 | 5/2010 | Erceg | |
| 2010/0184450 A1 | 7/2010 | Chen | |
| 2011/0131663 A1 | 6/2011 | Kaikuranta | |
| 2012/0307875 A1 | 12/2012 | Maguire | |

FOREIGN PATENT DOCUMENTS

WO 2012/166907 12/2012

OTHER PUBLICATIONS

International Search Report and Written Opinion for International Application PCT/US2014/024859, Aug. 11, 2014.

* cited by examiner

*Primary Examiner* — Daniel Washburn
*Assistant Examiner* — Fitwi Hailegiorgis
(74) *Attorney, Agent, or Firm* — Baker Botts L.L.P.

(57) ABSTRACT

An improved mobile communications device, of the type having a set of antennas and a narrowband RF transceiver coupled to a first member of the set of antennas, also includes a broadband RF receiver coupled to a second member of the set of antennas; and processing circuitry, coupled to the narrowband RF transceiver and the broadband RF receiver, that uses a received signal from the broadband receiver to determine a communication parameter for the narrowband RF transceiver. Related methods are also provided.

20 Claims, 13 Drawing Sheets

MOBILE COMMUNICATIONS DEVICES AND METHODS HAVING REDUCED COMMUNICATION LATENCY

CROSS-REFERENCE TO RELATED APPLICATION(S)

This patent application is a continuation of U.S. patent application Ser. No. 13/485,117, filed 31 May 2012, which claims the benefit of U.S. Provisional Patent Application No. 61/491,375 filed on May 31, 2011, which is hereby incorporated herein by reference in its entirety.

TECHNICAL FIELD

The present invention relates to improvements, in mobile communication devices and methods using narrowband heterodyne communications, designed to achieve low-latency connections between sets of wireless devices.

BACKGROUND ART

Modern wireless devices have a large range and therefore may be in contact with many other wireless devices at any particular time. Thus, if a device is seeking to transfer data to or from another device, it may have a large number of devices from which to select the desired wireless device. Additionally, there is the possibility that another device within range may interfere with, or breach the security of, a particular wireless device. To minimize the potential for a security breach or interference issues, a formal connection process is often initiated between wireless communications devices.

Many RF communications systems employ frequency diversity to minimize interference. This helps design robust systems, but as with many technology designs, this often results in design tradeoffs, and in particular, introduces latency: if there are N channels available, and to detect if a device is present on any one channel takes a maximum time $\tau$, then there is a connection-pairing latency up to $NT$ between two devices. In a typical multiple-frequency narrowband communication system, a base station designates a frequency (channel) for communication with a particular device, the two devices perform a handshake protocol to establish communications over the designated channel, and typically other devices are required to avoid the channel(s) that are in-use by other devices, e.g., by detecting channels that are in-use or by using a designated communication path for establishing communications with the base station.

To improve latency, the time $\tau$ may be reduced such that $NT$ is imperceptible to a human. However, reducing the time $\tau$ may be a challenge because frequency hop time typically is set by the loop filter of the phase-locked loop (PLL) of the radio chip, and this may be constrained for reasons such as PLL noise performance requirements. One may also design a media-access control (MAC) layer protocol stipulating new devices initialize a network session with an a priori channel selection. This may work in a peer-to-peer environment if there is sufficient signal to interference-plus-noise ratio (SINR) at this specific channel to allow communication to occur, although it may not be ideal for a base-station-to-device model, as the base station may spend valuable time on this channel while not using other channel(s) for devices already connected. At the MAC level, there is also the issue of how much time a radio should spend trying to connect to other devices versus how much time should be spent communicating with devices that are already connected. Therefore, the frequency hopping design may be less robust than other designs when attempting to maximize throughput, while minimizing latency for communications. Many wireless protocols have different design tradeoffs for the optimization of throughput and latency. For example, in wide area networks using wireless standards such as 3G and 4G, the initial association latency may be large, as device to cell tower communication may persist for a long time and base station protocols have appropriate protocols for base station hand off as the wireless device moves around in an environment. In the IEEE 802.11 Wi-Fi standard, association times can be several seconds due to the relative low duty cycle of broadcast Beacon commands (typically every 100 ms), and the number of channels (11 primary Wi-Fi channels in the US in the 2.4 GHz frequency range). In the Bluetooth Low Energy (BTLE) standard, 3 reserved channels are provided out of 40 total for communication initiation to improve latency.

Some wireless devices can transfer data via infrared communication ports or with radio frequency (RF) data transfer. Microwave technologies such as Bluetooth and Wi-Fi allow non-line-of-sight device-to-device communication. However, due to security concerns, these technologies require a set-up process in which a device must be added to the network. Although near-field-communication (NFC) can be used to exchange data between devices without adding a device to network, it functions only at a distance of 10 cm or less, and in practice this distance is 4 cm or less. Near field communication (NFC) is a radio frequency identification (RFID) protocol that operates with RF fields in the near-field, operating at 13.56 MHz. It is a superset of the ISO14443 and ISO18092 protocols, including security features such as elliptic curve cryptography (ECC) and the advanced encryption standard (AES). NFC is also used to exchange configuration information for other wireless standards such as Bluetooth and Wi-Fi; many Bluetooth headsets now include NFC tags for provisioning purposes. The gesture of placing a NFC headset near a phone now carries digital associative meaning.

There are disadvantages of relying on NFC to configure another wireless system. First, there is additional cost associated with providing NFC function in a wireless device. In the situation where a mobile phone carries the NFC radio, this can add geometric volume for circuitry and antennas that may pose tradeoffs with other components in the system, such as battery life, design and wireless functionality. Second, as NFC uses two physical layer protocols that must be time-sequenced, some transactions involving security can take appreciably longer than standard user interface latency of less than 10 ms. Finally, not all interactivity for establishing communications can be done within 0-10 cm; the range of manipulation by a person is limited to reach of the arms, which is typically 0.3-1 m. There are also cases in which a person is stationary but can see another person or object he/she potentially would like to connect to; he/she could walk to this location, but the wireless device in principle could allow almost imperceptible time to exchange information, obviating the need for ambulation. The operation of a television is an example of this situation, but the communication is generally handled by connectionless infrared protocols, or pre-associated devices based on Bluetooth or Wi-Fi.

One method of exchanging data is through passwords or secret keys. Another method of exchanging data with lower burden on the user is through time synchronization of an interaction, in which the users of two or more devices press a button to open a small security hole for a short window of time and exchange security keys. Some existing mobile devices can exchange accelerometer signals recorded when users bump their phones together. The exchange of accelerometer signals allows the devices to then exchange information.

These methods create temporary security issues, do not scale to large numbers of users, and can be socially awkward and wasteful of device design space.

FIG. 1 is a diagram of a prior art communications system 100 to which various embodiments of the invention may be applied. (Similarly various embodiments of the invention may be applied to the prior art arrangements illustrated in FIGS. 2A, 2B, 2C, 2D, 3A, 3B, 3C, and 4 described below.) The communication system 100 includes a base station 102 and multiple wireless devices 104a, 104b, 104c and 104d. The base station itself may be of the same device type as the wireless devices (e.g., a wireless device may act as a base station for some or all communication transactions). The base station transmits an RF signal 106 received by the wireless communication devices. According to one embodiment, the base station 102 is connected to a power source. The power source may be an electrical outlet, battery, or other electrical source. The base station 102 may also include one or more network interfaces for coupling to one or more wired or wireless networks, including, for example, a Local Area Network (LAN), a Wireless Local Area Network (WLAN), a Wide Area Network (WAN), a cellular network or a Public Switched Telephone Network (PSTN). According to various embodiments, wireless communication devices 104a-104d may include one or more mobile phones, iPhones, headphones, headsets (including a microphone and earphone), music players, iPods, personal digital assistants, iPads, tablets, laptops, computers, cameras, or other types of devices.

FIG. 2A is a diagram of a pair of prior art communication devices communicating to each other via a narrowband communication system 200. Each device is using a local oscillator (LO) in the transmitter and receiver path, specifically, one device is using LO1 205 and the other device is using LO2 210. One of the devices may be (or act as) a base station and the other may be (or act as) a wireless device. Since the receiver of each device has a finite bandwidth, the devices share a channel plan indicating, within the accuracy and precision of their local clocks that generate their local oscillators (LOs), what channel two devices will share to communicate with each other. There may be multiple communication channels, to allow bandwidth sharing and channel robustness from external interferers. For example, the 2.4 GHz Wi-Fi band from 2.403 GHz to about 2.483 GHz has somewhere between 11 and 14 overlapping channels. When two devices share the same channel, they are able to communicate with each other with high data rate corresponding to a large channel bandwidth, and depending on the protocol, low latency as well. When two devices do not share the same channel, some amount of time elapses while they switch their local oscillators to the same channel. For example, in some systems, the time may vary from about 100 μs is to several milliseconds. There also may be protocol-level latency associated with changing channels, such as the latency associated with beacon or advertising frames of data. If the transceiver of a device switches several times before occupying the same channel as the other device, this process may take several milliseconds to seconds.

FIG. 2B is an example showing a time domain waveform of an RF signal and waveforms of the same signal after detection using respectively a broadband detector 235b and a narrowband detector 240b. In this example, a transmitter from 205 modulates data using phase reversal amplitude shift keying (PR-ASK) modulation, typically used by the GS1/EPCG Global Gen2 or ISO18000-6C RFID protocol. The 0 and 1 bits are encoded using different time durations, with the bit sequence 010011 encoded in this example. The RF modulation 225b and a zoomed in version 230b show the RF cycles at 915.0 MHz. The RF signal 225b from the transmitter signal is detected both by a transceiver 210 using a broadband detector and by a separate, independent transceiver 210 using a narrowband detector. The broadband detector waveform 235b results from using a diode and single-pole low-pass filter envelope detector; the detected signal 235b from the broadband detector is similar to the source waveform 220b, but has some unfiltered and distorted parts of the original RF signal as a result of the nonlinearity of the detector and the characteristics of the single-pole filter. Nevertheless, the signal fidelity is more than adequate to extract the original bit sequence. The waveform 240b, resulting from application of the original RF signal to the narrowband detector, is an undistorted representation of the original waveform 220b, because the local oscillator (LO) of the narrowband detector closely matches the source (they are on the same channel). The high signal fidelity allows ready extraction of the original bit sequence.

FIG. 2C is an example similar to FIG. 2B, with the addition of a continuous wave (CW) interfering signal that is one channel higher (+10 MHz) than the transmitter. The amplitude of the interfering signal is ½ (that is, 3 dB below) that of the transmitter signal. The source signal with interference 225c is shown relative to the original envelope 220c from the transmitter. The broadband detected signal 235c shows additional distortion, as the entire waveform including interference passes through the nonlinearity and single-pole filter. If the detector has a variable gain and/or variable threshold, the original bit sequence might still be extracted, but with potentially higher bit error probability. As the interferer amplitude increases above ½ or −3 dB, the receiver will no longer be able to extract the bit pattern. But, as interferers remain further away from the broadband RF receiver than the transmitter, it is possible for data to be reliably extracted from the broadband RF receiver, as is done with RFID tags based on the GS1/EPCG Global Gen2 or ISO18000-6C RFID protocol. With a channel filter on the narrowband detector, the narrowband detected signal 240c is identical to 240b, and the interference is eliminated from the narrowband detector.

FIG. 2D is an example similar to FIG. 2B, except the LO of the transmitter from 205 is changed to the next channel, 10 MHz above 915.0 MHz. For the broadband detector, the detected signal is relatively independent of the LO frequency, and therefore the detected envelope 235d is essentially equivalent to 235b. The signal fidelity of the waveform 235d is more than adequate to extract the original bit sequence. For the narrowband detector with an LO of 915.0 MHz, as in the original example, the channel filter rejects the transmitted signal due to a LO mismatch. The waveform 240d is absent. It is possible there may be sufficient dynamic range in the narrowband receiver to recover the original data sequence, but major structural changes in the modem of the receiver may be required to manage the significant LO mismatch. There is an explicit tradeoff between channel rejection and the instantaneous acquisition of information between narrowband devices.

FIG. 3A is a time sequence diagram of a prior art arrangement wherein a client is connecting to an access point (AP) using the 802.11 protocol, using either Direct Sequence Spread Spectrum (DSSS) or Orthogonal Frequency Division Multiplexed (OFDM) modulation. The base station and client both operate narrowband transceivers that utilize oscillators and must choose a channel in the 2.4 and/or 5 GHz band to operate in. The base station sets its local oscillator to a CH1, which will be a specific frequency that is specific to a specific country of operation. For example, in the United States, there are 11 channels, starting at 2412 MHz (CH1) up to 2462 MHz (CH11). In the example shown in FIG. 3A, the client, trying to connect to an AP, sets its local oscillator LO2 to CH5. Since the Beacon packet from the AP, which are used to provide information to clients to connect to the AP, are on CH1, the client at CH5 does not see the Beacon packet. If there are no collisions on the channel, the AP will typically transmit Beacon packets every 100 ms. If there are collisions, this interval could be a multiple of 100 ms. The client, not seeing a Beacon frame, must jump to another channel to find a Beacon frame. In the worst possible case without collisions, with 11 channels, going to the same channel of the AP could take up to 11×100 ms=1.1 s, with an average of 6×100 ms=600 ms. When collisions are considered, this is the reason it can take several seconds for a client to see an intended AP. In a client to client (or peer to peer) model such as Wi-Fi Direct, the same structure of establishing data communications is required, as one client must play the role of AP and the other client must match to the channel of the other client. If multiple users greater than 2 would like to connect, the time for all clients to be connected can grow substantially.

FIG. 3B is a time sequence diagram of a prior art arrangement wherein a peripheral is connecting to a central system using the BTLE protocol, where the protocol specifies FHSS for the channel sharing algorithm. In this protocol, three of the total 40 channels in the range of 2402-2480 MHz are advertising channels for other devices, while the remaining 37 channels are for data. In the example shown, the central system sets its local oscillator to channel 38 or 2426 MHz, one of the advertising channels, while the peripheral tries to establish communications on channel 37 or 2402 MHz. The peripheral provides an ADV_DIRECT_IND packet to look for a central system to establish communications with, but because the two narrowband devices are not on the same channel, they are not able to see each other. By being on the incorrect channel, up to 10 ms could elapse before the peripheral switches channels. Then the peripheral chooses another channel, either in a static algorithmic or table-driven way, to channel 38. This channel is now the same channel as the central system, and therefore the ADV_DIRECT_IND message sent by the peripheral can be heard by the central system if there is a sufficient SINR. The central system responds with a SCAN_REQ response, and is now able to send packets to the peripheral. In this example, the time for the peripheral to connect to the central system is under 20 ms, but in general, with 3 advertising channels, connection time could be under 10 ms, under 20 ms, or under 30 ms. With a connection time on average of 20 ms, this is a short time on human perceptible scales, but could potentially be shorter to allow more data to be transmitted during this interval.

FIG. 3C is a time sequence diagram of a prior art arrangement wherein a GS1/EPCG Global Gen2 or ISO18000-6C RFID reader is communicating with a Gen2 or ISO18000-6C RFID tag using a broadband transceiver on the tag. The tag is capable of operating over a worldwide frequency range of 860-930 MHz. The tag can either be powered by the RF field itself, termed a passive tag, or a local power source such as a battery, and it is termed a semi-passive RFID tag. The choice of power source in the embodiment of the Gen2 of ISO18000-6C protocol does not change the timing of the system, but increases the receiver sensitivity of the tag, enabling longer distance communications. Regardless of the power source, an RFID reader communicates with a RFID tag using amplitude modulation, and the tag communicates to the RFID reader using backscatter amplitude modulation. In some embodiments, the amplitude modulation is double sideband amplitude shift keying (DSB-ASK), phase reversal amplitude shift keying (PR-ASK) or single sideband amplitude shift keying (SSB-ASK). When the tag backscatters, the RFID tag generates a reflection of a partial component of the interrogating RF wave. By varying the impedance of the circuitry presented to its antenna, the RFID tag can modulate in a time-sequenced manner the amount of the partial component to communicate information. The receiver of the RFID reader is capable of extracting this partial component as an amplitude shift keyed signal. In a backscatter system, the tag does not generate or use its own local oscillator (LO); it simply communicates ASK data on the RF wave originating from the reader, as described above. This means there is no carrier synchronization required, but the tradeoff is that the path loss from the reader to the tag and back is at least double the path loss of a traditional active radio system. Therefore, the explicit tradeoff of a backscatter system with an active transmitter is that the path loss is double for the backscatter system, but the latency on any channel is significantly lower on average than an active radio system.

In the example shown in FIG. 3C, the RFID tag is able to extract power from the RF field of the reader, and therefore the Power State replaces the Local Oscillator state in this time sequence. Immediately after the reader has settled its local oscillator, it transmits CW for a time required of the protocol to turn the Power State of the tag to ON from the OFF state. The reader can then immediately modulate its RF transmitted wave to send data to the RFID tag and the tag can interpret the data. Finally, the tag processes the information sent by the reader and responds with a backscatter response to the reader information. In the EPCG/GS1 protocol, the time that a reader can communicate with a tag varies with the bit time of the transmitter and the bit time of the tag. For the example where the bit-0 time, or Tari is 6.25 μs, and the Backscatter Link Frequency (BLF) of the RFID tag is 640 KHz with FM0 modulation, the time for the reader to obtain 96-bits of information in addition to a 16-bit random number, 16-bits of protocol control bits and a 16-bit cyclic redundancy check (CRC) is approximately 2.5 ms, with each incremental packet from an RFID tag being approximately 1.0 ms. If the BLF is 400 kHz, this time is approximately 2.7 ms, with each incremental packet from an RFID tag being approximately 1.2 ms. If the BLF uses a Miller modulation with M=4 and a BLF of 256 kHz, the time is approximately 4.8 ms, with each incremental packet from an RFID tag being approximately 3.2 ms. In practice, if there are many tags in the field, the rate of incremental packet acquisition can be slowed down by the efficiency of a slotted ALOHA protocol, typically e, the base of the natural logarithm, or 2.72 times slower than the numbers described above. Also in practice, channel noise may slow down the rate of acquisition of data from the RFID tags, as would be true of any RF protocol. Nevertheless, in practice, the connection time for a broadband receiver system used in this example is capable of being significantly faster than the Wi-Fi or Bluetooth examples above.

FIG. 4 is a schematic diagram of the transceiver portion of a conventional mobile communications device 400. On the transmitter side, a modem 450 generates a set of digital signals that are converted into an analog baseband signal by the transmit baseband 425. After digital-to-analog conversion in the transmit baseband 425, low pass filtering may be implemented in this block. An I&Q modulator 420 mixes the local oscillator signal 430 with the transmit baseband signals, typically combines them into a single output, to produce modulation at the intended radio frequency. The I&Q modulator 420 may be composed of analog mixers, buffers, amplifiers, and filters. This signal is filtered, amplified 415 and then switched 410 through one or more antennas 405. On the receive side, a received signal comes through one or more switched antenna elements 410, which are amplified by a low-noise amplifier (LNA) 435, and then converted to baseband via an I&Q demodulator 440. The LNA 435 and I&Q demodulator 440 may optionally include a peak detector for channel power measurements or for automatic gain control (AGC). Like the I&Q modulator 420, the I&Q demodulator 440 may be composed of analog mixers, buffers, amplifiers, and filters. The generated I&Q analog baseband signals are processed by a series of amplifiers, analog-to-digital converters and processed using a series of digital operations that make up the receive baseband 445, to produce a digital stream that is received by the modem MAC 450. Many types of radios such as Bluetooth, Wi-Fi, GSM, RFID readers may operate in this manner at a high level, but perhaps with multiple independent transmit and receive subcomponents.

SUMMARY OF THE EMBODIMENTS

In a first embodiment of the invention there is provided an improved mobile communications device of the type having a set of antennas, and a narrowband RF transceiver coupled to a first member of the set of antennas. In this embodiment, the improvement includes a broadband amplitude-shift-key receiver, coupled to a second member of the set of antennas, to produce a digital signal; and processing circuitry, coupled to the narrowband RF transceiver and the broadband amplitude-shift-key receiver, that processes the digital signal to determine a communications channel for the narrowband RF transceiver and to set a frequency of the narrowband RF transceiver to correspond to the determined communications channel.

Optionally, the narrowband RF transceiver is one of a Wi-Fi transceiver, a Bluetooth transceiver, a GSM transceiver, a CDMA transceiver, or an RFID transceiver. Optionally, the narrowband RF transceiver is configured to transmit both amplitude-shift-keyed RF signals for a broadband RF receiver and narrowband RF signals. Optionally, the device further includes an amplitude-shift-key transmitter for a broadband receiver separate from the narrowband RF transceiver. Optionally, the device further includes a backscatter amplitude-shift-key transmitter coupled to the processing circuitry, the backscatter amplitude-shift-key modulator allowing for broadband transmissions in response to the digital signal while the frequency of the narrowband RF transceiver is being set. Optionally, the device further includes a plurality of antennas; and a switching matrix, coupled to the plurality of antennas and to the narrowband RF transceiver and the broadband amplitude-shift-key RF receiver, that selectively couples each of the narrowband RF transceiver and the broadband amplitude-shift-key receiver to either identical sets or distinct sets of the antennas. Optionally, the processing circuitry is configured to monitor the narrowband RF transceiver and the broadband amplitude-shift-key receiver in parallel for received information relevant to operation of the narrowband RF transceiver, and wherein the processing circuitry is configured to determine a communications channel for the narrowband RF transceiver and to set a frequency of the narrowband RF transceiver based on information received from the broadband amplitude-shift-key RF receiver when relevant information is received from the broadband amplitude-shift-key RF receiver before relevant information is received from the narrowband RF transceiver. Also optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information.

In another embodiment, the invention provides a method of selecting a communications channel for a narrowband RF transceiver in a mobile communications device. In this embodiment, the method includes:

receiving an input RF signal at the mobile communications device, the input RF signal being encoded using an amplitude-shift-keyed modulation scheme;

demodulating the input RF signal using broadband amplitude-shift-keyed demodulation to obtain a digital signal;

processing the digital signal to determine the communications channel; and setting a frequency of the narrowband RF transceiver to correspond to the determined communications channel.

Optionally, the narrowband RF transceiver is one of a Wi-Fi transceiver, a Bluetooth transceiver, a GSM transceiver, a CDMA transceiver, or an RFID transceiver. Optionally, the method further includes monitoring the narrowband RF transceiver and the broadband amplitude-shift-key RF receiver in parallel for received information relevant to operation of the narrowband RF transceiver. Optionally, the method further includes responding to the input RF signal using a backscatter amplitude-shift-key transmitter while the frequency of the narrowband RF transceiver is being set. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information.

In another embodiment, the invention provides an improved mobile communications device of the type having a set of antennas and a narrowband RF transceiver coupled to a first member of the set of antennas. In this embodiment, the improvement includes a broadband RF receiver coupled to a second member of the set of antennas; and processing circuitry, coupled to the narrowband RF transceiver and the broadband RF receiver, that uses a received signal from the broadband receiver to determine a communication parameter for the narrowband RF transceiver.

Optionally, the narrowband RF transceiver is one of a Wi-Fi transceiver, a Bluetooth transceiver, a GSM transceiver, a CDMA transceiver, or an RFID transceiver. Optionally, the narrowband RF transceiver is configured to transmit both amplitude-shift-keyed RF signals for a broadband RF receiver and narrowband RF and broadband amplitude-shift-keyed signals. Optionally, the device further includes a broadband RF transmitter for a broadband RF receiver separate from the narrowband RF transceiver. Optionally, the device further includes a backscatter transmitter coupled to the processing circuitry, the backscatter modulator allowing for broadband transmissions in response to the digital signal while the communication parameter for the narrowband RF transceiver is being set. Optionally the device further includes a plurality of antennas; and a switching matrix, coupled to the plurality of antennas and to the narrowband RF transceiver and the broadband RF receiver, that selectively couples each of the narrowband RF transceiver and the broadband RF receiver to an antenna. Optionally, the processing circuitry is configured to monitor the narrowband RF transceiver and the broadband RF receiver in parallel for received information relevant to operation of the narrowband RF transceiver, and wherein the processing circuitry is configured to set a communication parameter for the narrowband RF transceiver based on information received from the broadband RF receiver when relevant information is received from the broadband RF receiver before relevant information is received from the narrowband RF transceiver. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information. Optionally, the communication parameter includes at least one of a frequency for narrowband RF communication, a channel for narrowband RF communication, a security parameter for narrowband RF communication, or a connection token for narrowband RF communication.

In another embodiment, the invention provides a method of configuring a communication parameter for a narrowband RF transceiver in a mobile communications device. The method of this embodiment includes:

receiving an input RF signal at the mobile communications device, the input RF signal being encoded using a first modulation scheme;

demodulating the input RF signal using broadband RF demodulation to obtain a digital signal;

processing the digital signal to determine a communication parameter for the narrowband RF transceiver from the digital signal; and setting the communication parameter for the narrowband RF transceiver.

Optionally, the narrowband RF transceiver is one of a Wi-Fi transceiver, a Bluetooth transceiver, a GSM transceiver, a CDMA transceiver, or an RFID transceiver. Optionally, the method further includes monitoring the narrowband RF transceiver and the broadband RF receiver in parallel for received information relevant to the communication parameter. Optionally, the method further includes responding to the input RF signal using a backscatter transmitter while the communication parameter for the narrowband RF transceiver is being set. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information. Optionally, the communication parameter includes at least one of a frequency for narrowband RF communication, a channel for narrowband RF communication, a security parameter for narrowband RF communication, or a connection token for narrowband RF communication.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
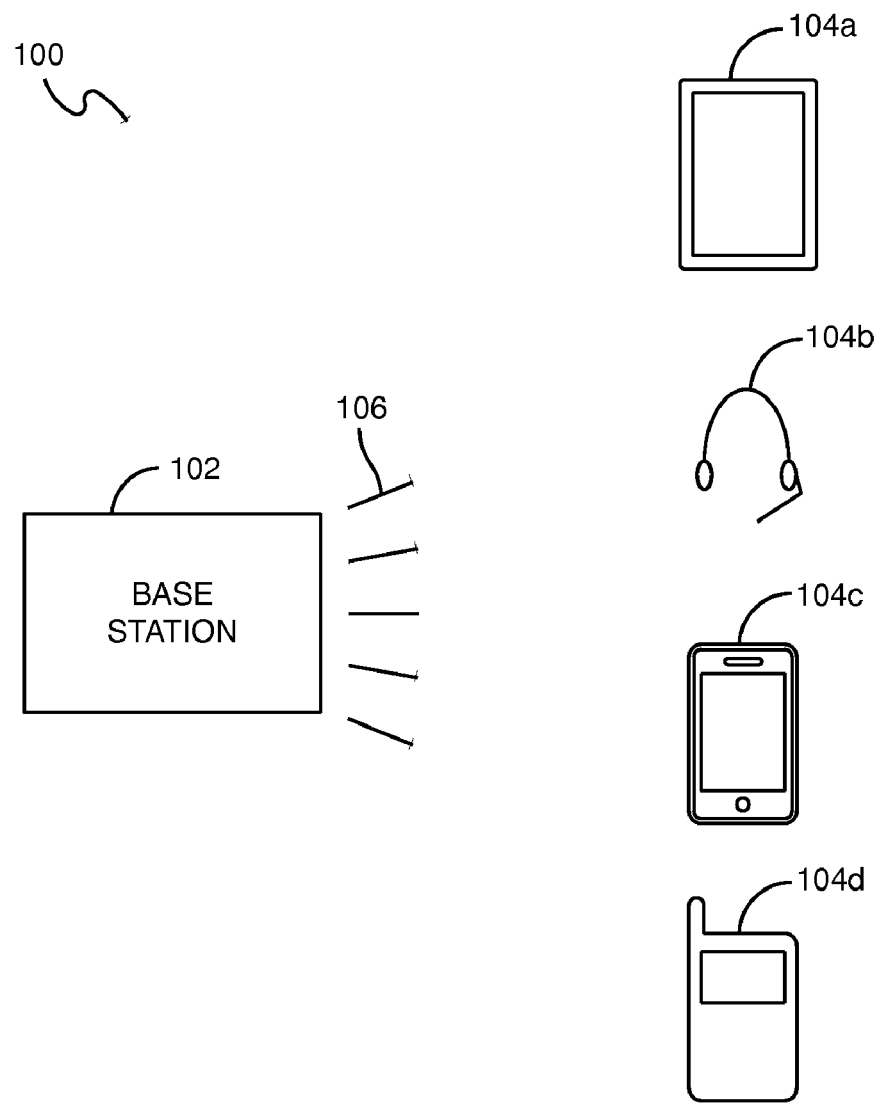
FIG. 1 is a diagram of a prior art communications system 100 to which various embodiments of the invention may be applied.
Figure 2A:
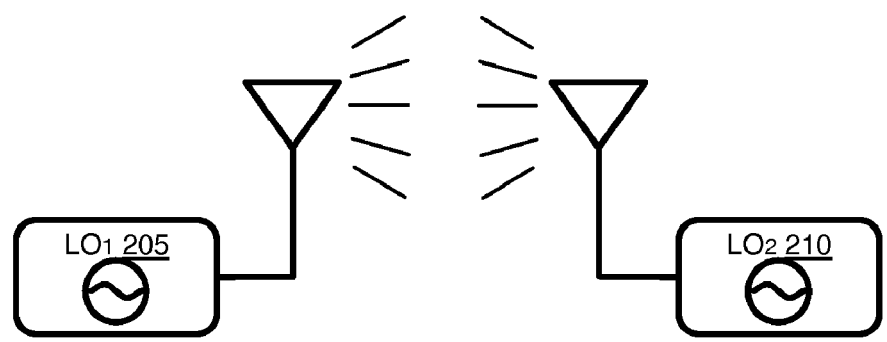
FIG. 2A is a diagram of a pair of prior art communication devices communicating to each other via a narrowband communication system 200.
Figure 2B:
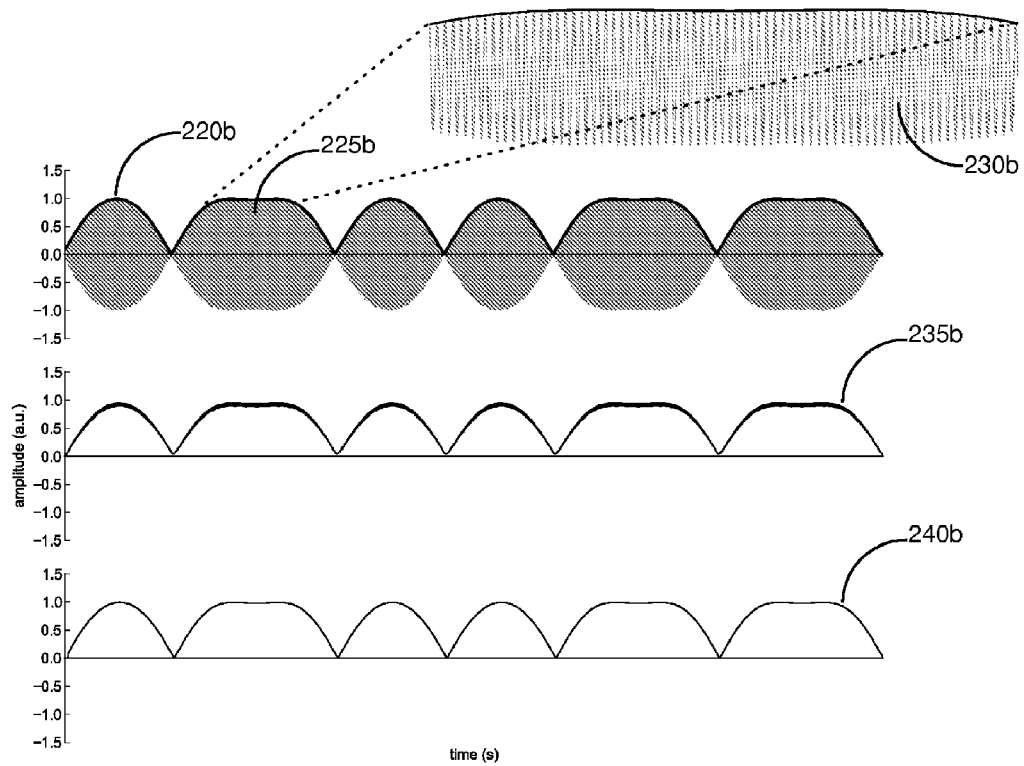
FIG. 2B is an example showing a time domain waveform of an RF signal and waveforms of the same signal after detection using respectively a broadband detector and a narrowband detector.
Figure 2C:
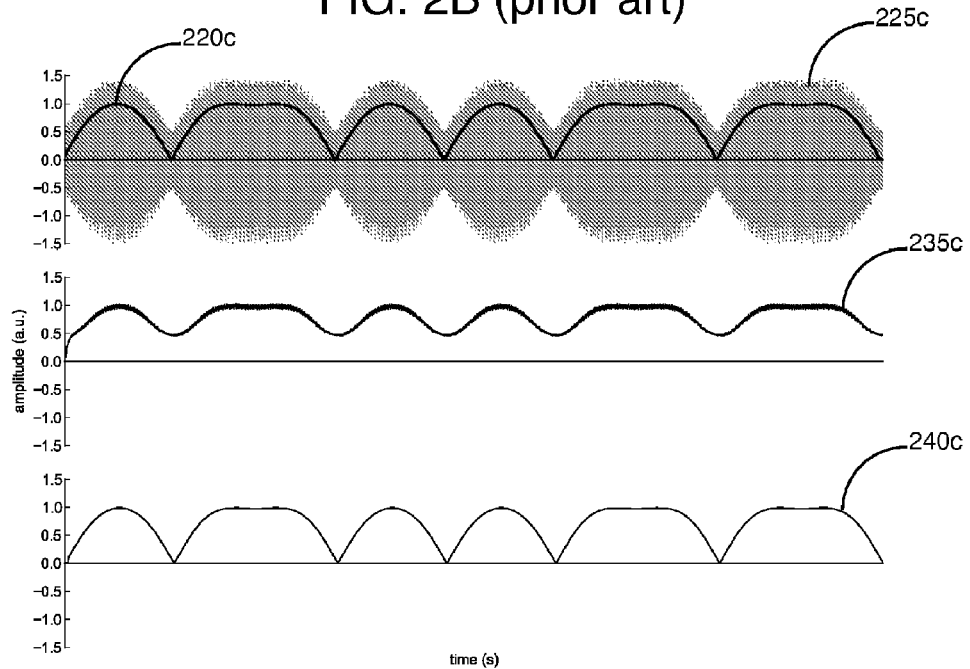
FIG. 2C is an example similar to FIG. 2B, with the addition of a continuous wave (CW) interfering signal that is one channel higher (+10 MHz) than the transmitter.
Figure 2D:
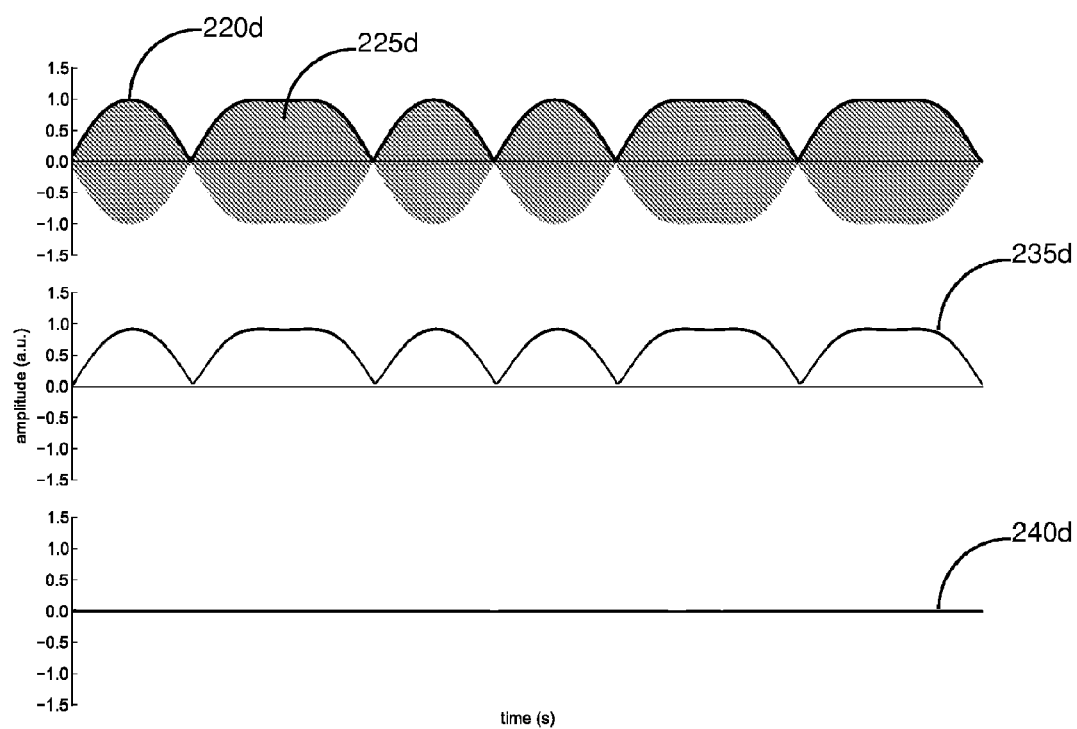
FIG. 2D is an example similar to FIG. 2B, except the LO of the transmitter from 205 is changed to the next channel, 10 MHz above 915.0 MHz.

Definitions. As used in this description and the accompanying claims, the following terms shall have the meanings indicated, unless the context otherwise requires:

A mobile communications device is one of (1) a portable wireless communications device that includes a narrowband transceiver or (2) a base station device that can communicate with such a portable wireless communications device. A portable wireless communications device optionally may be configured to communicate with another such portable wireless communications device. A base station device optionally may be implemented by a portable wireless communications device.

A "set" has at least one member.

The term "broadband" refers to a wireless communication technology that utilizes an envelope detector in the receiver for communication. Broadband communication transmitters can utilize amplitude modulation (e.g., amplitude shift keying), phase modulation (e.g., phase shift keying), or frequency modulation (e.g., frequency shift keying). Some RFID tag technologies, for example, use broadband communication.

The term "narrowband" refers to a wireless narrowband communication technology that utilizes a heterodyne detector in the receiver for communication. Examples include Bluetooth, Wi-Fi, GSM, and certain RFID reader technologies.

As discussed above, there can be a substantial amount of latency for two devices to connect with one another for communication over a narrowband communication system. Therefore, in embodiments of the present invention, the devices additionally use broadband communications for virtually immediate communication between devices when the devices are in proximity with one another. While broadband communication may be used for an entire communication session between the devices (which may be one-way from a base station device to another device, or may be bi-directional between the devices), more typically broadband communication will be used to pass information that allows the devices to quickly establish communication over the narrowband communication system without the latency caused by the frequency hopping, handshaking, or other delays in the narrowband communication system. For example, the devices can use broadband communication to convey such things as device identification information (e.g., a source device address, a destination device address), channel identification information, security information (e.g., encryption parameters), symbol rate information, error correction information, channel equalization information, timing information, protocol information, physical layer information, medium access control (MAC) layer information, data link layer information, network layer information and/or other information. Based on the information passed between the devices via broadband communication, the devices can quickly establish communication over the narrowband communication system and then switch over from broadband communication to narrowband communication. For example, the base station may pass a channel number to the mobile communications device, allowing the mobile communications device to go immediately to the channel for communication with the base station over the narrowband communication system.

The combined use of broadband detection and narrowband detection allows one to communicate with a nearby device in parallel with established communications methods. It allows maintenance of high bandwidth communication, but can significantly improve latency. Broadband communication does not possess the sensitivity to receive messages that can be obtained from narrowband communications, and therefore the latency will improve relative to a system without a broadband receiver, but will only provide a benefit for a wireless device within a certain communication range of another device. One property of this type of demodulator is that regardless of the channels occupied by two devices trying to connect with each other using broadband ASK detection, the two devices are able to commence communication immediately through the broadband channel.

Although the present invention is not limited to a particular broadband wireless communication technology, in certain specific embodiments, broadband amplitude-shift-keyed (ASK) technology of the type used in many radio frequency identification (RFID) systems is employed. Broadband ASK detection allows one device to communicate with a nearby device in parallel with established communications, but it does not possess the sensitivity to receive messages from devices that have path losses that are too great. Thus, the devices must be in relatively close proximity to one another to communicate via broadband. The use of RFID-based broadband communication allows for virtually immediate communication between the devices, and also can allow the devices to communicate with other RFID devices, such as RFID tags.

Figure 3A:
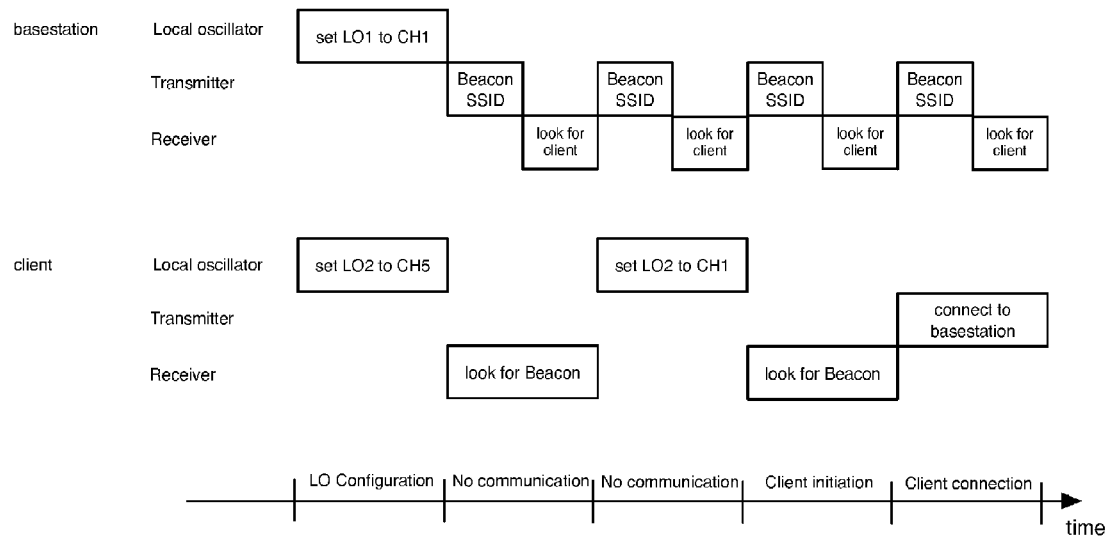
FIG. 3A is a time sequence diagram of a prior art arrangement wherein a client is connecting to an access point (AP) using the 802.11 protocol, using either Direct Sequence Spread Spectrum (DSSS) or Orthogonal Frequency Division Multiplexed (OFDM) modulation.
Figure 3B:
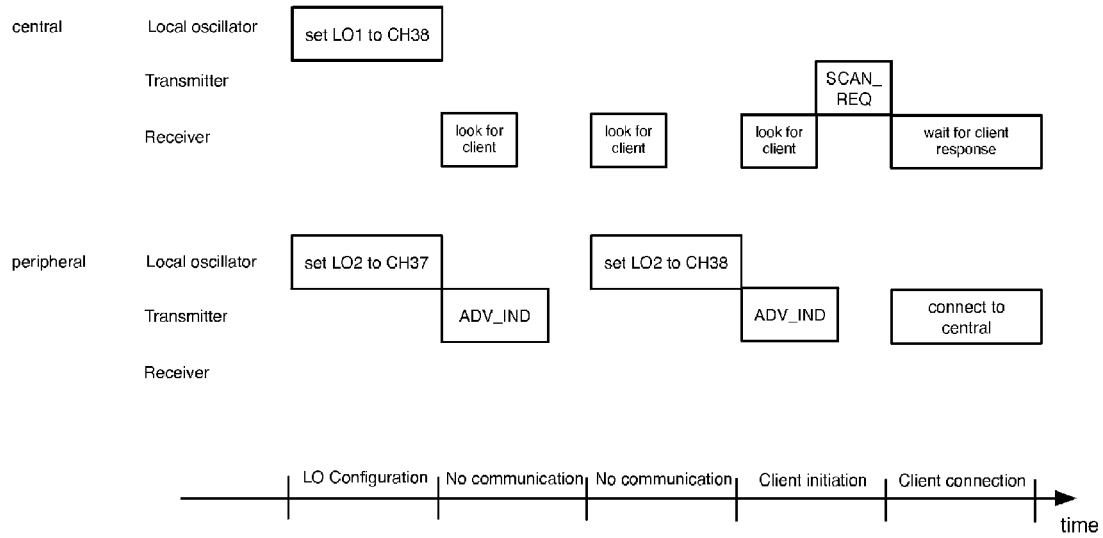
FIG. 3B is a time sequence diagram of a prior art arrangement wherein a peripheral is connecting to a central system using the Bluetooth Low Energy (BTLE) protocol, where the protocol specifies FHSS for the channel sharing algorithm.
Figure 3C:
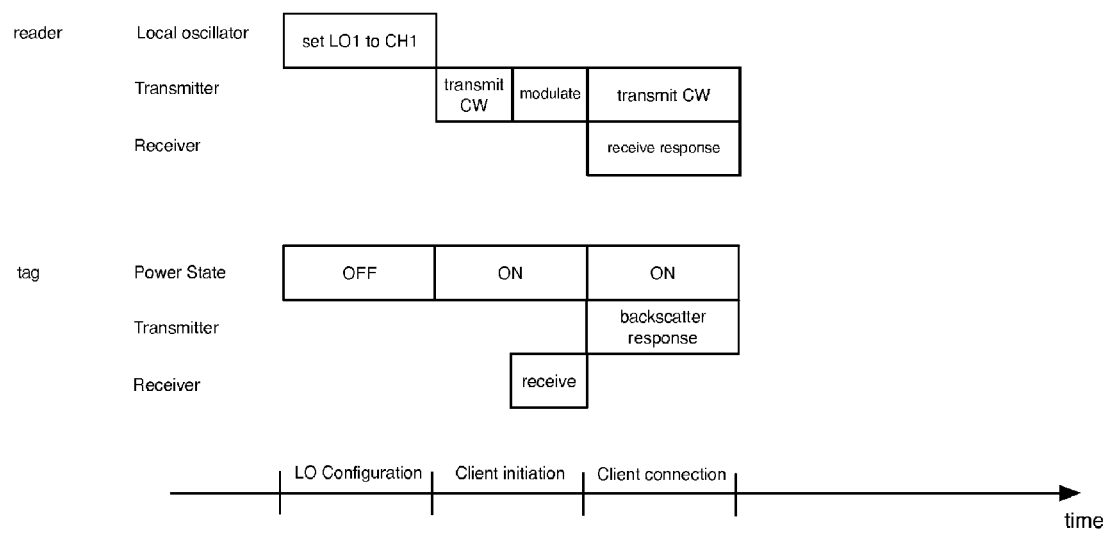
FIG. 3C is a time sequence diagram of a prior art arrangement wherein a GS1/EPCG Global Gen2 or ISO18000-6C RFID reader is communicating with a Gen2 or ISO18000-6C RFID tag using a broadband transceiver on the tag.
Figure 5A:
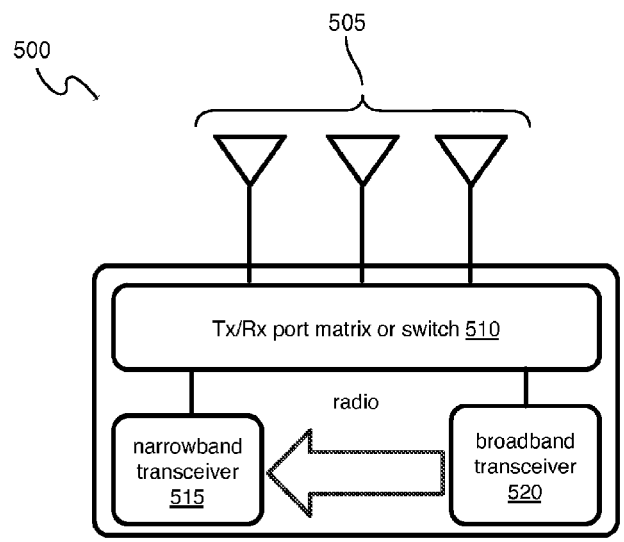
FIG. 5A is a high-level schematic block diagram of a device 400 in accordance with an exemplary embodiment of the present invention.

FIG. 5A is a high-level schematic block diagram of a device 500 in accordance with an exemplary embodiment of the present invention. To address the issue of minimizing latency of a narrowband communication system, embodiments of this invention incorporate a broadband radio transceiver 520 that is connected to a set of antennas 505 via a transmit/receive port matrix or switch 510. The bandwidth of the broadband transceiver 520 could either be wider, equal or narrower than the bandwidth of the antennas 505. A broadband transceiver using RFID communication technology (e.g., as shown in FIG. 3C) can be used to ensure that a device using a narrowband transmitter can communicate immediately with another wireless communication device. Rather than limit clients to be RFID tags, embodiments may incorporate the front end of an RFID tag into the narrowband radio. This incorporation may be done as a circuit board assembly of multiple discrete or integrated designs, or the narrowband and broadband transceivers may be integrated into the same integrated circuit (IC). When the broadband transceiver 520 receives and processes information that may be of relevance to the narrowband transceiver, it transfers this information to the narrowband transceiver 515. In one embodiment, this information may be physical layer information such as the channel the narrowband transceiver 515 should connect to, as would be used in Wi-Fi or Bluetooth communications. In other embodiments, this information may be symbol rate information, error correction information or channel equalization information for configuration of the physical layer. In other embodiments, this information may be timing information for the Media Access Controller (MAC) that could be useful for time synchronization or power management. In yet other embodiments, this information could be information relevant to other layers of the OSI model, such as data link information, security keys and protocols, IP and other network protocol information, or application information.

Figure 5B:
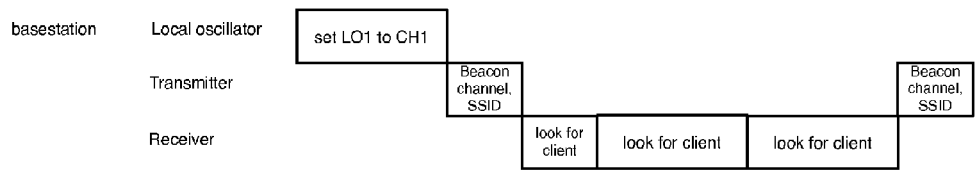
FIG. 5B is a time sequence of a Wi-Fi embodiment on this invention using a broadband receiver on the client to receive an ASK or PSK-modulated signal from the base station.
Figure 5B:
Figure 5B:
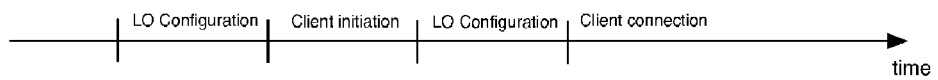

FIG. 5B is a time sequence of a Wi-Fi embodiment on this invention using a broadband receiver on the client to receive an ASK or PSK-modulated signal from the base station. This modulated RF waveform from the base station is received by the broadband transceiver of the client and informs the active radio of the channel and SSID of the base station AP to connect to. By combining a broadband transceiver with a narrowband transceiver, this invention aims to minimize the latency of establishing narrowband, robust active radio communication. It should be noted that if a peer to peer system is required, both the base station and clients could possess transmitters that are capable of ASK modulation and broadband receivers; a broadband receiver is shown on the client only to simplify the figure and explanation of the invention. The base station sets the LO of its narrowband transceiver to channel 1, then modulates its RF transmitted signal with an ASK Beacon packet that contains its channel (CH1) and SSID. Because the client possesses a broadband receiver, it is able to receive this information regardless of the channel that the base station is on. The client is able to set its LO to CH1, then connect to the base station. This would ensure that in this extension of the Wi-Fi standard, a nearby client would only be required to wait a maximum of 100 ms to be able to connect to the base station, six times faster than without a broadband receiver. Optionally, the broadband transceiver could include a backscatter ASK modulation component, as is found in RFID tags, to respond to the ASK Beacon packet while the LO is being changed in parallel. If the client is further than the range where the broadband receiver can interpret the modulated data, the client can default to the original standard algorithms outlined in FIG. 3A. For point of reference, the state of the art for a broadband powered receiver is about −34 dBm for a battery-assisted passive RFID tag, compared to about −92 dBm for a Wi-Fi radio.

As prior art for systems that minimize latency for narrowband communication, some systems use the NFC HF RFID protocol to enable faster configuration of Bluetooth and Wi-Fi networks, reducing latency. This is a similar idea to that posed here, where a broadband HF radio with a separate antenna communicates with a client to reconfigure a UHF or microwave radio. In the embodiment of this invention, the broadband and narrowband transceivers share a plurality of antennas, and can share much of the same transceiver analog and digital components. This allows a reduction of cost, as no new antennas or switches or extra analog or digital components are required. This invention also allows far-field communication; a typical operating distance for NFC is a maximum of 10 cm, and often 1-4 cm, while for a UHF or microwave backscatter system, this communication distance can be typically 1-20 m. With this invention, a substantially larger and usable communication distance can be used to reduce the latency of the narrowband transceiver. With the NFC protocol, this is an umbrella protocol for two incompatible physical layer protocols: ISO14443 A/B; and ISO18092. With two physical layer protocols, a substantial amount of time (up to 1 s) of security overhead and protocol switching time is much longer than what could be potentially implemented with a UHF or microwave protocol based on EPCG/GS1 UHF Gen2, derivatives therein, or a custom protocol created for these specific applications. Thus the cost, area and time savings of this invention relative to the state of the art could provide substantially better operating points and applications of wireless communication technology.

Figure 5C:
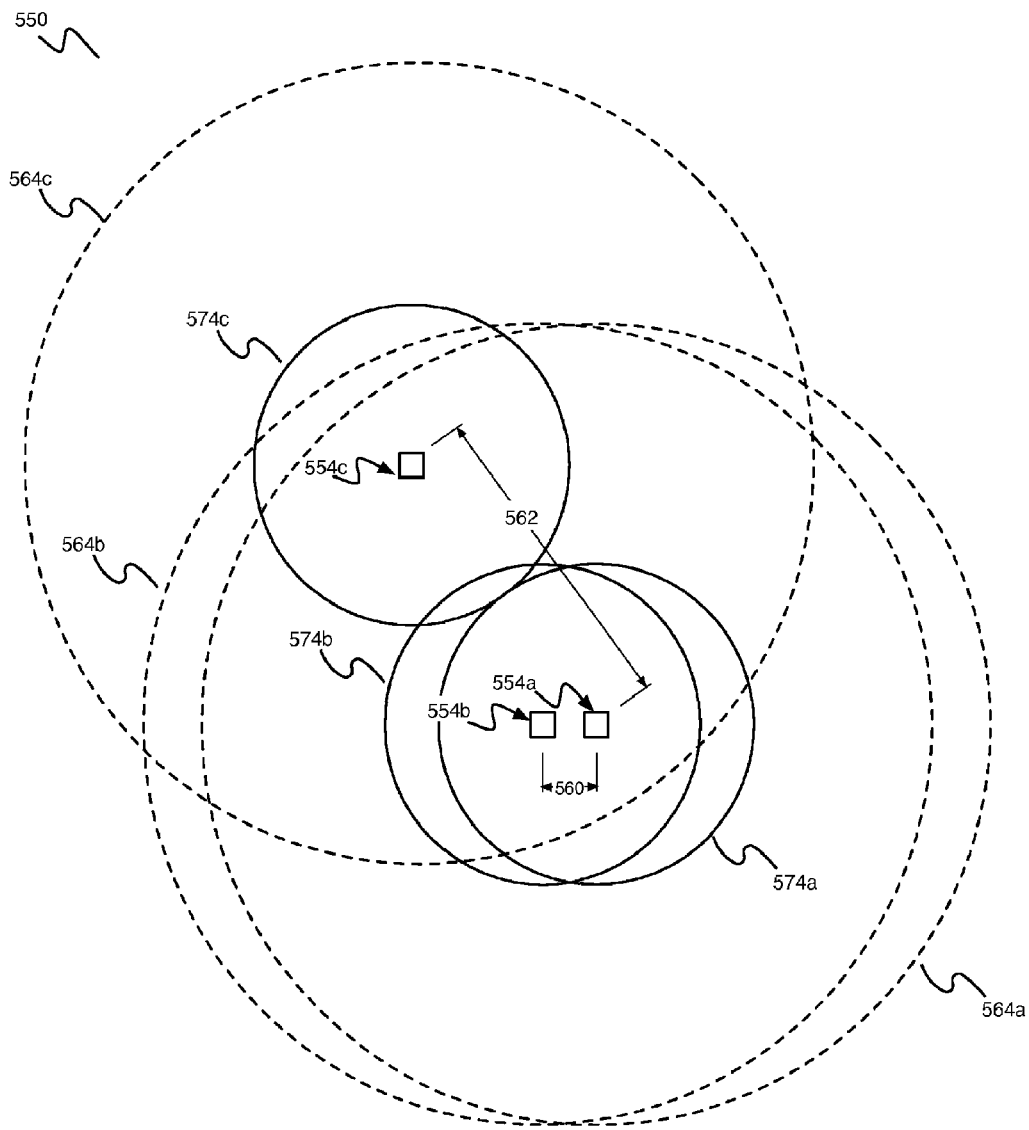
FIG. 5C is a schematic diagram showing communication modalities among three wireless clients 554a, 554b, and 554c using both narrowband transceivers and broadband transceivers.

FIG. 5C is a schematic diagram showing communication modalities 550 among three wireless clients 554a, 554b, and 554c using both narrowband transceivers and broadband transceivers. Client 554a has a narrowband communication range shown as 564a, dependent on the transmit power of 554a and the receive sensitivity of 554b and 554c. The receive sensitivities of transceivers in clients 554a-c will be dependent on the fundamental data rate, channel capacity, implementation margin and level of interference in the environment. As shown in FIG. 5C, clients 554b and 554c are able to receive messages from 554a through narrowband communications, as the distances 560 and 562 from 554b and 554c to 554a respectively are shorter than the communication range 564a from 554a. And for the sake of illustration, if we assume the transmitter and receiver sections of the transceivers of clients 554b and 554c have the same operating and environmental characteristics as those of the transceiver of 554a, the narrowband communication ranges 564b and 564c, of clients 554b and 554c respectively, are greater than distances 560 and 562 respectively. With this assumption, both devices 554b and 554c are capable of communicating with 554a. As these systems are employing numerous communication channels and unknown levels of interference, the time to initiate or re-establish communications may take 10 s of milliseconds to seconds, depending on the protocol used, as discussed in more detail above. These systems also employ broadband communications, and, for that purpose, rather than using a heterodyne receiver, they employ a rectifier or envelope detector that rectifies signals across a large bandwidth. For bandwidth, gain or other reasons, the receiver sensitivities of the transceivers of clients 554a-c may be poorer than those of their corresponding narrowband receivers. It is also possible that the transmit power of these devices for broadband communications is lower than for narrowband communication, further limiting range of communication. The broadband communication ranges 574a and 574b for clients 554a and 554b, respectively, are larger than the distance 560 between clients 554a and 554b, and thus broadband communication between clients 554a and 554b is also possible. Therefore, clients 554a and 554b are capable of reduced latency and high bandwidth communications compared to a narrowband transceiver alone, and are able to be at a separation distance 560 appropriate to a specific application. However, separation distance 562 is larger than the broadband communication ranges 574a and 574c of clients 554a and 554c respectively, and so they can communicate only with higher latency and narrow bandwidth communications. This example demonstrates that under certain circumstances low latency high bandwidth communication using a broadband transceiver may be limited to ranges shorter than narrowband communications, but should not degrade existing wireless standards and protocols. In some cases, the reduced distance limitation could be advantageous to ensuring that users who wish to share some types of information faster than is conventionally done have the knowledge that this distance limitation may be restricted to their visual field, for example.

Figure 4:
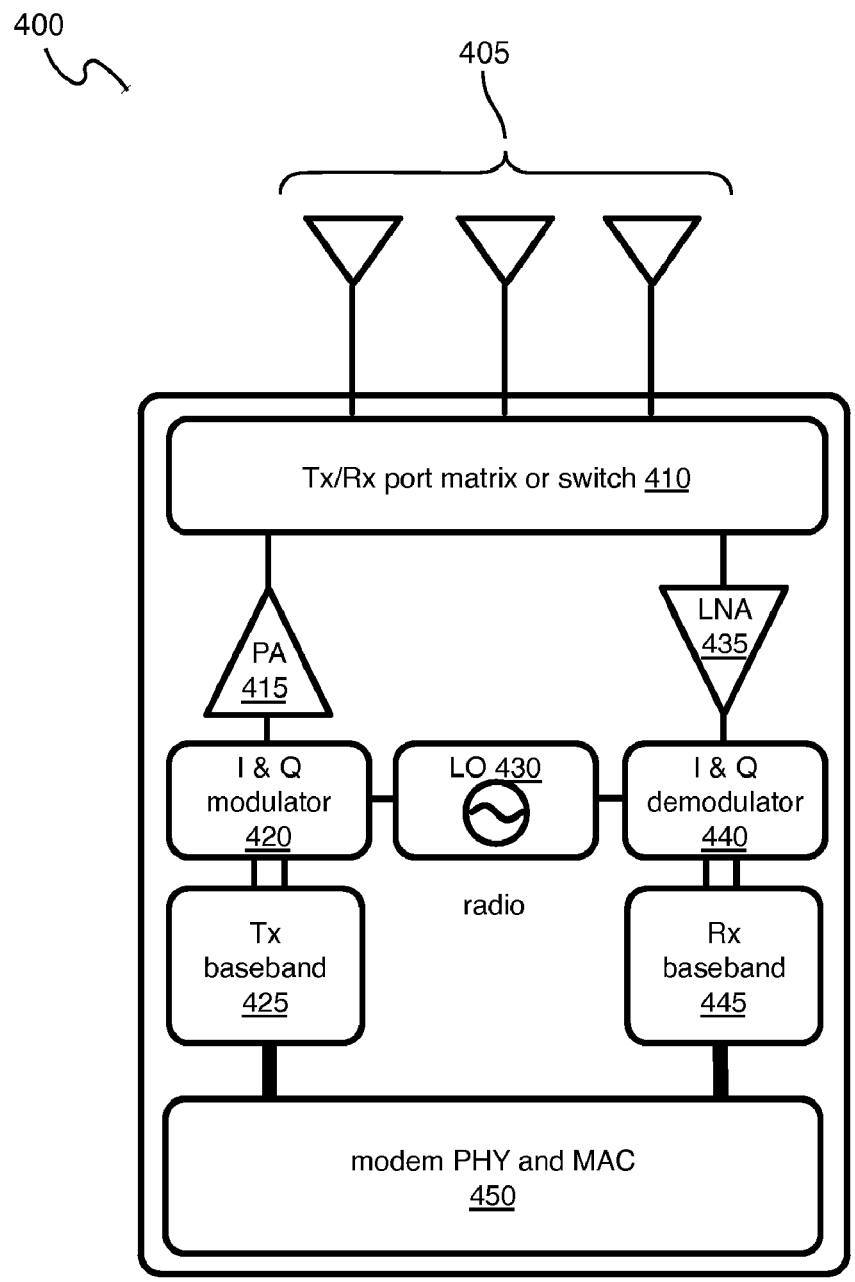
FIG. 4 is a schematic diagram of the transceiver portion of a conventional mobile communications device 400.
Figure 6:
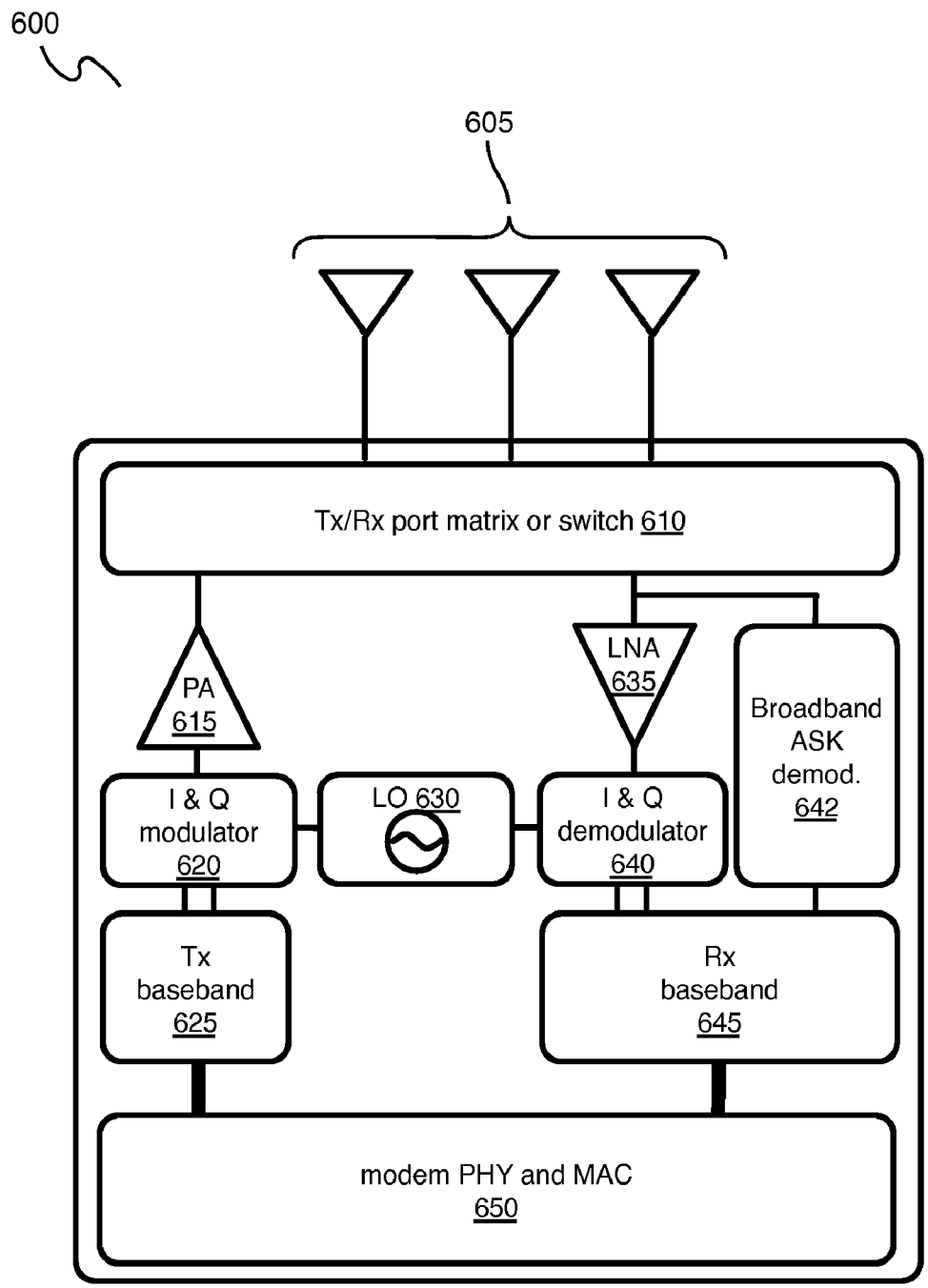
FIG. 6 is a schematic diagram of the transceiver section of a new mobile communications device 600 based on that in FIG. 5A, in accordance with an embodiment of the present invention.

FIG. 6 is a schematic diagram of the transceiver section of a new mobile communications device 600 based on that in FIG. 5A, in accordance with an embodiment of the present invention. The transceiver section contains a broadband ASK demodulator 642 to allow digital data to immediately be received by the radio modem PHY and MAC 650 even if two devices exist on separate channels in the narrowband communication system. This may be a separate data path from the antenna(s) 605 and switch 610 than the LNA 635 and narrowband I&Q demodulator 640 and may be converted to digital information by the receive baseband 645. It should be noted that the broadband demodulator 642 is not required to use the local oscillator (LO) 630 to decode the bits pattern into the receive baseband 645 and hence is able to decode bits at any frequency at which another device is capable of transmitting. It should also be noted that the broadband demodulator could optionally use the LNA component 635. The transmitter chain 650, 625, 620, 615 (which typically is substantially the same as the transmitter chain 450, 425, 420, 415 of the device shown in FIG. 4) may be adapted or otherwise used to transmit signals for a broadband receiver (in addition to I&Q modulated signals for communication over the narrowband communication system) since such transmitters are generally capable of supporting multiple modulation schemes, including OFDM, PSK and ASK. Alternatively, a separate broadband transmitter may be included in the device. The broadband ASK demodulator 642 may receive power from any frequency within the bandwidth of the antenna, and therefore may be jammed more frequently than the narrowband demodulator 640. The broadband ASK demodulator 642 uses amplitude levels to set the corresponding high and low phases of a binary symbol—the bits themselves may be decoded as time differences in the symbols, such as the PIE encoding using by the GS1 Generation 2 v1.20 protocol. This amplitude thresholding may result in the implementation margin of the symbols being significantly higher than the narrowband receiver (650 645 640 635) since it does not use all the information present in the symbols. It should be noted that broadband ASK demodulators are responsive to a wide bandwidth, but are capable of rejecting lower power input ASK signals that are input at different channels; this is described in the DRM subcomponent of the GS1 Generation 2 v1.20 protocol. Overall, the use of a broadband transceiver allows a trade-off between minimizing latency versus link margin, with no actual loss of link margin due to the presence of the original narrowband transceiver. As the embodiment described herein is an example, different structures for the narrowband and broadband transceivers are possible: If power optimization is required on the transmitter and/or if broadband and narrowband operation are simultaneously required, independent transmitter chains could be used for broadband and narrowband operation. On the receiver side, the broadband ASK demodulator 642 could be replaced by a demodulator and modulator (active and/or passive) to allow a base station to send information to a client but also to allow the client to respond immediately with a message such as a connection request, physical layer or MAC parameters, security, or information relevant to other layers of the OSI model, such as data link information, security keys and protocols, IP and other network protocol information, or application information.

Figure 7:
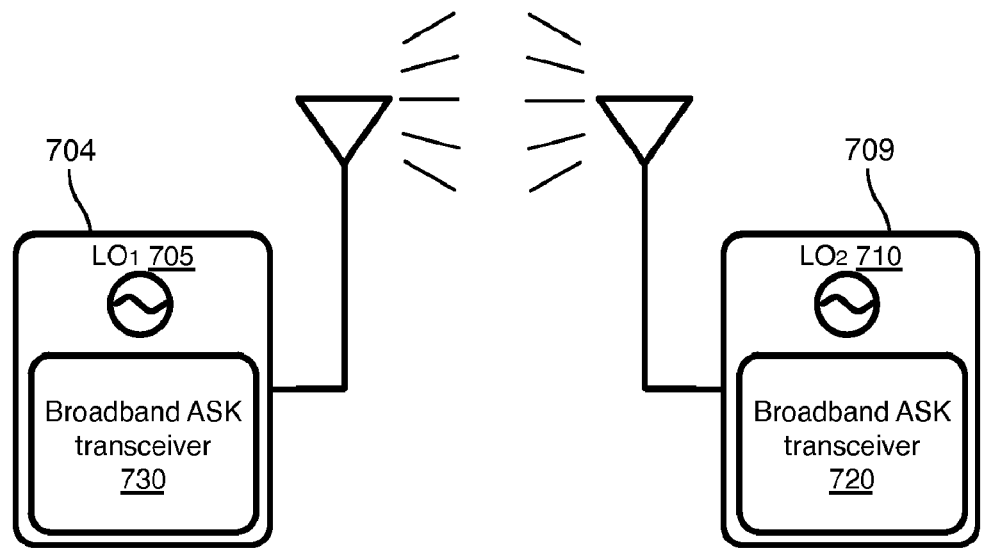
FIG. 7 is a diagram, in accordance with an embodiment of the present invention, of the two mobile communications devices from FIG. 2, but now with broadband ASK transceivers 730 and 720, respectively, in addition to the narrowband transceivers operating at different frequencies based on their local oscillator (LO) frequencies 705 and 710, respectively.

FIG. 7 is a diagram, in accordance with an embodiment of the present invention, of the two mobile communications devices from FIG. 2, but now with broadband ASK transceivers 730 and 720, respectively, in addition to the narrowband transceivers operating at different frequencies based on their local oscillator (LO) frequencies 705 and 710, respectively. In one example, one device 704 uses a local oscillator LO1 705 and the other device 709 uses a local oscillator LO2 710, and as long as the link margin is sufficient for broadband communication between the two devices, the devices are able to exchange relevant information via the broadband communication channel, typically in a time much shorter than the two devices setting their local oscillators to the same channel. As discussed above, the information passed via broadband communication may include device identification information or other information about the radio or layers above the MAC and PHY layers, but generally at least the frequency at which the local oscillator of the device is operating. In one exemplary embodiment, latency is minimized for a reduction in link margin, and, to enable the exchange of this information, the two devices are closer to each other than the ultimate range over which the devices can communicate via the narrowband communication system. If the devices are too far apart for this low-latency data exchange, the devices may (and normally would) fall back to their normal narrowband demodulators. It should be noted that in some embodiments, one of the devices may be a dedicated base station device, while in other embodiments, one of the devices will assume the role of the base station. Thus, for example, device 704 may act the base station in one transaction to send the frequency of its LO 705 to device 709, while device 709 may act as the base station in another transaction to send the frequency of its LO 710 to device 704.

Typically, the base station device (or a device acting as a base station device, i.e., a device used to initiate communication) will transmit predetermined broadband signals either continuously or from time to time. If the base station device has separate broadband and narrowband transmitters, then the device may transmit the broadband signals concurrently with transmission of narrowband signals, e.g., the device may concurrently try to establish a communication connection using both the broadband transmitter and the narrowband transmitter. If the base station device uses a common transmitter for both broadband and narrowband transmissions, then the device may try to establish a communication connection by alternating between transmission of broadband signals and transmission of narrowband signals. In either case, once a broadband communication is established with another device, information can be passed between the devices as discussed above, and the devices can switch to narrowband communications based on such information.

Any mobile communications device having an appropriate broadband demodulator that comes within range of the base station device can receive the broadband transmissions. The base station may allow for communication with any passing device or may limit communication only to one or more specific devices (e.g., using a device address or other device identifier). The communication may be unidirectional (i.e., from base station device to mobile communications device) or may be bi-directional (e.g., the devices may establish a two-way communication connection or otherwise may pass data to one another).

Figure 8:
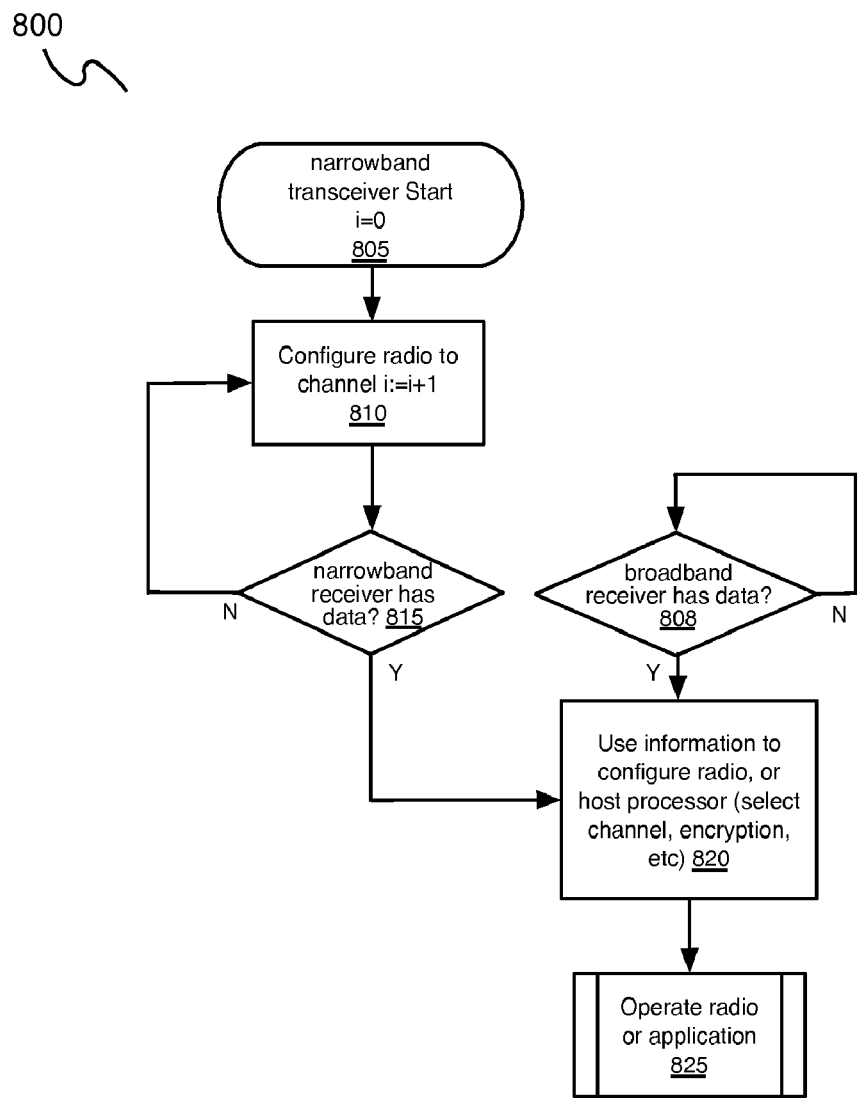
FIG. 8 is a flow diagram 800 of how the two receiver paths of a device such as the device 600 can use information to minimize latency and maximize throughput, in accordance with one exemplary embodiment.

FIG. 8 is a flow diagram 800 of how the two receiver paths of a device such as the device 600 can use information to minimize latency and maximize throughput, in accordance with one exemplary embodiment. As described in FIG. 6, the broadband demodulator 642 may receive data in a parallel path with the narrowband receiver 635 and 640. In parallel, the narrowband receiver and the broadband receiver will be monitored for the presence of data. Monitoring the narrowband receiver involves initiating the narrowband receiver in block 805 and then iteratively stepping through channels (block 810) and checking if the narrowband receiver has data (block 815). If either path has information (YES in block 808 or block 815), such data may be used to immediately configure the radio or application processor (block 820) so that the radio or application can operate (block 825). Otherwise, the radio operates in the same manner it operated in before the broadband transceiver was introduced into the system; that is, the narrowband transceiver will be reconfigured to operate on a different channel to try again to communicate with a base station or other client.

Figure 9A:
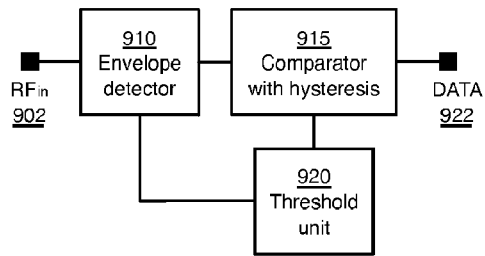
FIG. 9A shows an illustrative embodiment of the broadband ASK demodulator in accordance with an embodiment of the present invention.

FIG. 9A shows an illustrative embodiment of the broadband ASK demodulator in accordance with an embodiment of the present invention. The RF signal in 902 from one of the antenna ports 605 is directed into an envelope detector 910, which exploits a non-linear device to rectify the RF signal, effectively down converting it down to baseband. The output of the envelope detector is also input into a threshold unit 920, a dynamic module to enable bit slicing. A dynamic threshold is required to ensure bits are properly decoded from the transmitter. The output of the envelope detector 910 and the threshold unit 920 are input into the comparator and hysteresis module 915, converting the two analog signals into a digital out, or DATA. If the levels from the comparator with hysteresis 915 are within those of a CMOS digital circuit levels ($V_{dd}/2$ to Vdd for bit 1 and between GND to $V_{dd}/2$ for bit 0), then the output stream of digital information may be passed to a logic decoder to turn the timing information into a digital stream.

Figure 9B:
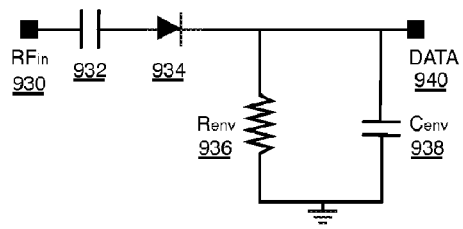
FIG. 9B shows a basic envelope detector 910 in accordance with an embodiment of the present invention.

FIG. 9B shows a basic envelope detector 910 in accordance with an embodiment of the present invention. In FIG. 9B, after DC removal with a bypass capacitor 932, a diode 934 rectifies the incoming signal and produces a current, and a low-pass filter made of $R_{env}$ 936 and $C_{env}$, act as an envelope tracker or low pass filter from the rectified signal.

Figure 9C:
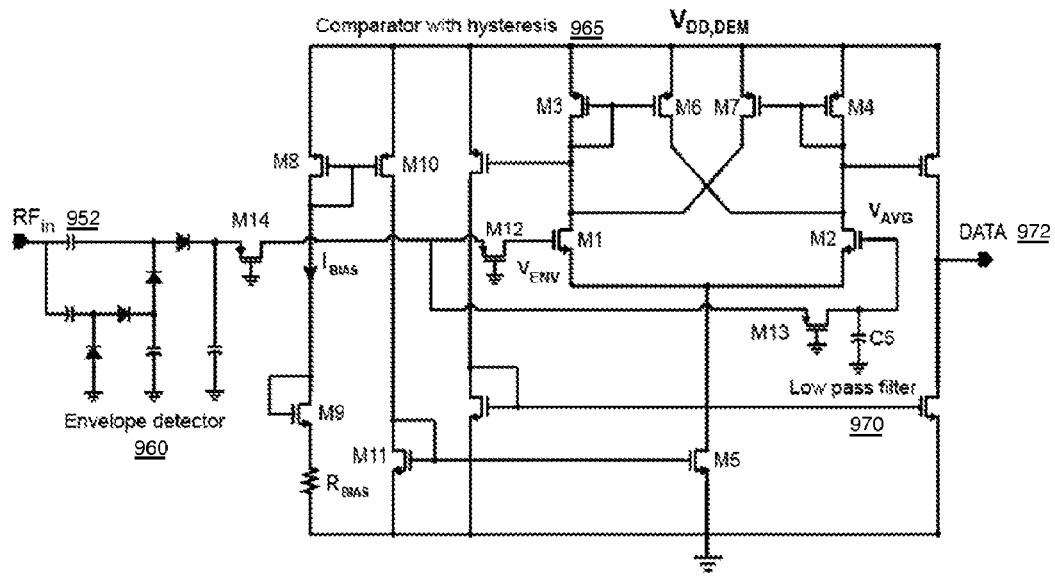
FIG. 9C illustrates an envelope detector and associated circuitry for use with embodiments herein.

FIG. 9C illustrates an envelope detector and associated circuitry for use with embodiments herein. The schematic of FIG. 9C is taken from Jong-Wook Lee and Bomson Lee, "Long-Range UHF-Band Passive RFID Tag IC Based on High-Q Design Approach," *IEEE Transactions on Industrial Electronics*, 57(7):2308-2316 (2009). FIG. 9C, shows a CMOS circuit including the envelope detector 960, comparator with hysteresis 965, voltage level-setting and low-pass filter 970. The state-of-the-art demonstrated for circuits of this nature are passive RFID tags, which are sensitive to −20 dBm, and battery-assisted passive tags have been demonstrated to be sensitive to −30 to −34 dBm. If the mobile device or base station contains a RFID reader to communicate with one or more wireless tags, but also contains a tag emulation circuit, the broadband demodulation circuit may be useful for the applications described herein. In that case, the majority of the radio (antenna, switching circuitry, modem and corresponding software) would be shared, allowing costs to be reduced. Other types of envelope detectors may be used, such as RF logarithm detectors.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A device comprising:
    a narrowband radio-frequency (RF) transceiver;
    a set of antennas comprising at least (1) a first antenna coupled to the narrowband RF transceiver and (2) a second antenna configured to receive a broadband signal comprising information for configuring the narrowband RF transceiver;
    a broadband amplitude-shift-key receiver coupled to the second antenna and configured to:
        receive, from the second antenna, the broadband signal; and
        produce a digital signal based on the broadband signal, the digital signal comprising the information for configuring the narrowband RF transceiver; and
    circuitry coupled to the narrowband RF transceiver and to the broadband amplitude-shift-key receiver, wherein the circuitry is configured to:
        receive the digital signal from the broadband amplitude-shift-key receiver;
        process the digital signal to determine, based on the information for configuring the narrowband RF transceiver, source device identification information and channel identification information, the channel identification information corresponding to a specific communications channel; and
        set a frequency of the narrowband RF transceiver based on the determined specific communications channel, wherein the narrowband RF transceiver is then able to send or receive information using the specific communications channel.

2. The device of claim 1, wherein the narrowband RF transceiver is one of:
    a Wi-Fi transceiver;
    a Bluetooth transceiver;
    a GSM transceiver;
    a CDMA transceiver; or
    a radio-frequency identification (RFID) transceiver.

3. The device of claim 1, wherein the narrowband RF transceiver is configured to transmit both amplitude-shift-keyed RF signals for a broadband RF receiver and narrowband RF signals.

4. The device of claim 1, further comprising an amplitude-shift-key transmitter configured to transmit a signal for a broadband receiver, wherein the amplitude-shift-key transmitter is separate from the narrowband RF transceiver.

5. The device of claim 1, further comprising a backscatter amplitude-shift-key modulator coupled to the circuitry, the backscatter amplitude-shift-key modulator allowing for broadband transmissions in response to the digital signal while the frequency of the narrowband RF transceiver is being set.

6. The device of claim 1, further comprising a switching matrix, coupled to the set of antennas, the narrowband RF transceiver, and the broadband amplitude-shift-key receiver, that selectively couples each of the narrowband RF transceiver and the broadband amplitude-shift-key receiver to either identical members or distinct members of the set of antennas.

7. The device of claim 1, wherein the digital signal includes at least one of:
    source device identification information;
    destination device identification information;
    channel identification information;

security information;
symbol rate information;
error correction information;
channel equalization information;
timing information;
protocol information;
physical layer information;
medium access control layer information;
data link layer information;
network layer information; or
application information.

8. A method comprising:
by a mobile communications device, receiving a broadband signal, the broadband signal being encoded using an amplitude-shift-keyed modulation scheme and the broadband signal comprising information for configuring a narrowband radio-frequency (RF) transceiver;
by a broadband amplitude-shift-key receiver of the mobile communications device, demodulating the broadband signal using broadband amplitude-shift-keyed demodulation to obtain a digital signal, the digital signal comprising the information for configuring the narrowband RF transceiver;
by the mobile communications device, processing the digital signal to determine, based on the information for configuring the narrowband RF transceiver, source device identification information and channel identification information, the channel identification information corresponding to a specific communications channel; and
by the mobile communications device, setting a frequency of the narrowband RF transceiver based on the determined specific communications channel, wherein the narrowband RF transceiver is then able to send or receive information using the specific communications channel.

9. The method of claim 8, further comprising monitoring the narrowband RF transceiver and the broadband amplitude-shift-key receiver in parallel for received information relevant to operation of the narrowband RF transceiver.

10. The method of claim 8, further comprising responding to the broadband signal using a backscatter amplitude-shift-key transmitter while the frequency of the narrowband RF transceiver is being set.

11. A device comprising:
a narrowband radio-frequency (RF) transceiver;
a set of antennas comprising at least (1) a first antenna coupled to the narrowband RF transceiver and (2) a second antenna configured to receive a broadband RF signal comprising information for configuring the narrowband RF transceiver;
a broadband RF receiver coupled to the second antenna and configured to:
  receive, from the second antenna, the broadband RF signal; and
  produce a digital signal based on the broadband RF signal, the digital signal comprising the information for configuring the narrowband RF transceiver; and
circuitry coupled to the narrowband RF transceiver and to the broadband RF receiver, wherein the circuitry is configured to:
  receive the digital signal from the broadband RF receiver;
  process the digital signal to determine, based on the information for configuring the narrowband RF transceiver, source device identification information and channel identification information, the channel identification information corresponding to a specific communications channel; and
  set a frequency of the narrowband RF transceiver based on the determined specific communications channel, wherein the narrowband RF transceiver is then able to send or receive information using the specific communications channel.

12. The device of claim 11, wherein the narrowband RF transceiver is configured to transmit both RF signals for a broadband RF receiver and narrowband RF signals.

13. The device of claim 11, further comprising a RF transmitter configured to transmit a signal for a broadband RF receiver, wherein the RF transmitter is separate from the narrowband RF transceiver.

14. The device of claim 11, further comprising a backscatter modulator coupled to the circuitry, the backscatter modulator allowing for broadband transmissions in response to the digital signal while the communication parameter for the narrowband RF transceiver is being set.

15. The device of claim 11, further comprising a switching matrix, coupled to the set of antennas, the narrowband RF transceiver, and the broadband RF receiver, that selectively couples each of the narrowband RF transceiver and the broadband RF receiver to either identical members or distinct members of the set of antennas.

16. The device of claim 11, wherein the digital signal includes at least one of:
source device identification information;
destination device identification information;
channel identification information;
security information;
symbol rate information;
error correction information;
channel equalization information;
timing information;
protocol information;
physical layer information;
medium access control layer information;
data link layer information;
network layer information; or
application information.

17. The device of claim 11, wherein the information for configuring the narrowband RF transceiver includes at least one of:
a frequency for narrowband RF communication;
a channel for narrowband RF communication;
a security parameter for narrowband RF communication; or
a connection token for narrowband RF communication.

18. A method comprising:
by a mobile communications device, receiving a broadband radio-frequency (RF) signal, the broadband RF signal being encoded using a first modulation scheme and the broadband RF signal comprising information for configuring a narrowband RF transceiver;
by a broadband RF receiver of the mobile communications device, demodulating the broadband RF signal using broadband RF demodulation to obtain a digital signal, the digital signal comprising the information for configuring the narrowband RF transceiver;
by the mobile communications device, processing the digital signal to determine, based on the information for configuring the narrowband RF transceiver, source device identification information and channel identification information, the channel identification information corresponding to a specific communications channel; and by the mobile communications device, setting a frequency of the narrowband RF transceiver based on the determined specific communications channel, wherein the narrowband RF transceiver is then able to send or receive information using the specific communications channel.

19. The method of claim 18, further comprising monitoring the narrowband RF transceiver and the broadband RF receiver in parallel for received information relevant to the communication parameter.

20. The method of claim 18, further comprising responding to the received broadband RF signal using a backscatter transmitter while the communication parameter for the narrowband RF transceiver is being set.

* * * * *